(12) United States Patent
Murphy et al.

(10) Patent No.: US 6,666,938 B1
(45) Date of Patent: Dec. 23, 2003

(54) LEAD ABATEMENT SYSTEM AND METHOD FOR APPLICATION

(76) Inventors: Ruth Murphy, 6014 Pinehurst Rd., Baltimore, MD (US) 21212; Garry West, 1142 Scott St., Baltimore, MD (US) 21230

(\*) Notice: Subject to any disclaimer, the term of this patent is extended or adjusted under 35 U.S.C. 154(b) by 0 days.

(21) Appl. No.: 10/160,051

(22) Filed: Jun. 4, 2002

(51) Int. Cl.⁷ .................. E04F 21/02; B32B 31/26; A62D 5/00
(52) U.S. Cl. ............ 156/71; 156/309.9; 156/322; 588/249; 588/261
(58) Field of Search .............. 156/71, 155, 308.2, 156/309.9, 320, 322; 52/741.4, 745.05, 745.06, 746.1; 427/138, 208.6; 588/1, 6, 249, 254, 259, 261

(56) References Cited

U.S. PATENT DOCUMENTS

| 4,791,159 | A |   | 12/1988 | DuLaney et al. ........ 524/297 |
| 4,936,938 | A |   | 6/1990  | Simpson et al. ........ 156/244.23 |
| 5,019,195 | A | * | 5/1991  | Skinner ............... 156/71 |
| 5,096,759 | A |   | 3/1992  | Simpson ............... 428/40 |
| 5,142,837 | A |   | 9/1992  | Simpson et al. ......... 52/409 |
| 5,685,112 | A |   | 11/1997 | Fara .................. 52/202 |
| 6,001,423 | A | * | 12/1999 | Johnson ............... 427/403 |

\* cited by examiner

Primary Examiner—Richard Crispino
Assistant Examiner—Sing P. Chan
(74) Attorney, Agent, or Firm—Welsh & Flaxman LLP

(57) ABSTRACT

A lead abatement method approved for use by governmental agencies is described. The method id achieved by first applying a highly compliant protective film over a lead contaminated surface. The film includes an exposed layer and an adhesive layer composed of an adhesive material adapted for substantially permanent bonding to the contaminated surface. The exposed surface is then perforated and a topcoat is applied to the exposed surface. The topcoat is adapted for treatment of the exposed surface of the film so as to permit treatment of the topcoat in a desired manner.

14 Claims, 1 Drawing Sheet

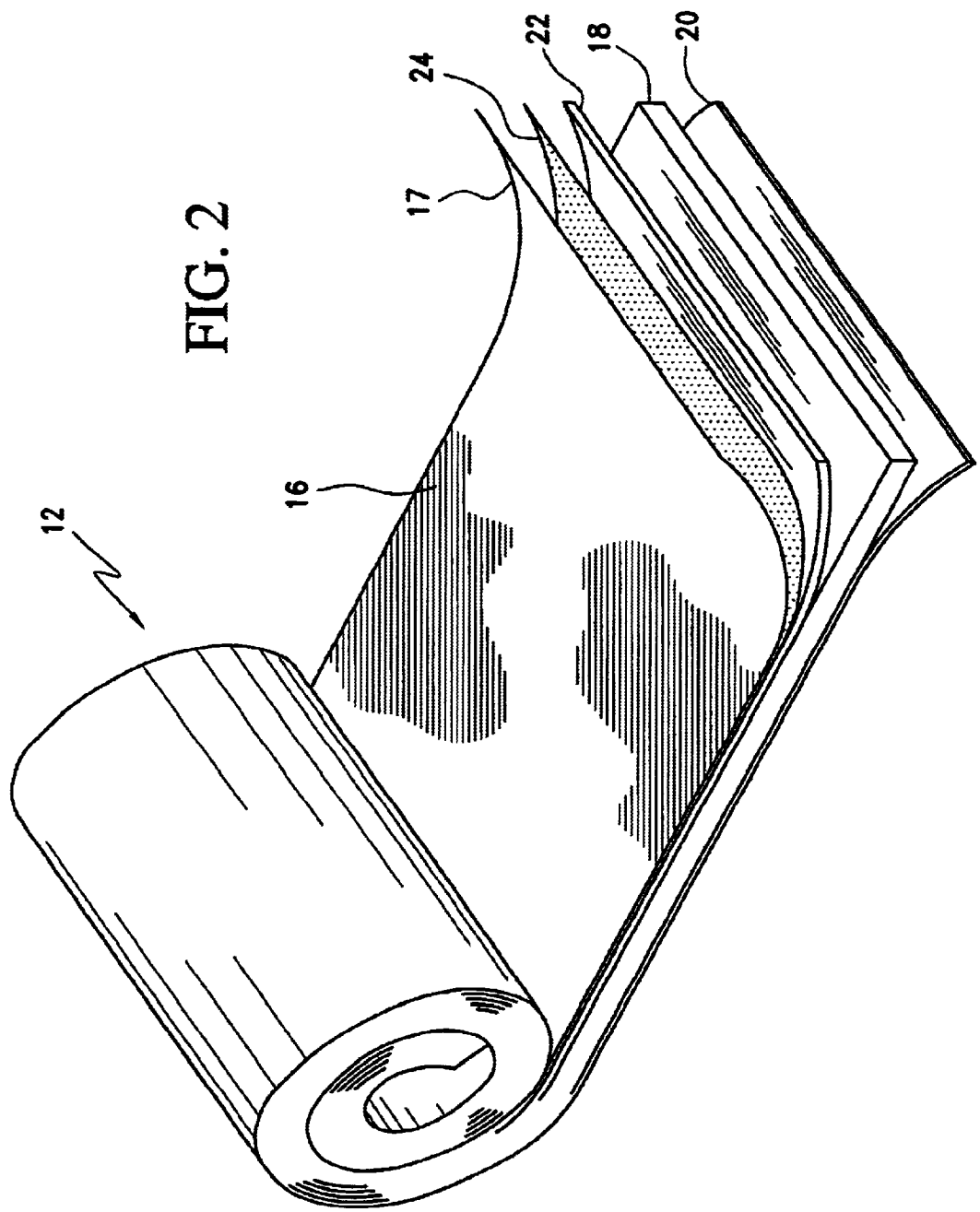
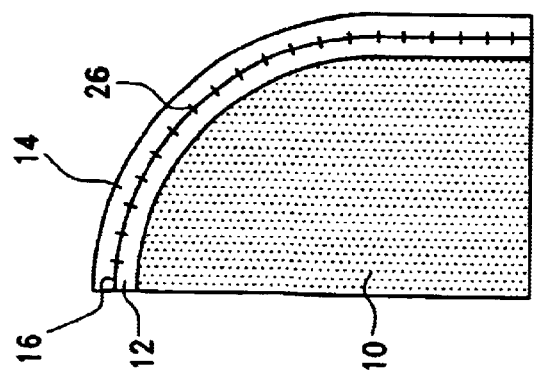

LEAD ABATEMENT SYSTEM AND METHOD FOR APPLICATION

BACKGROUND OF THE INVENTION

1. Field of the Invention

The invention relates to a system and method for lead abatement. More particularly, the invention relates to the application of a protective film to lead contaminated surfaces so as to encapsulate the lead contaminated surfaces in a manner preventing human or animal contact with lead leaching or peeling from the contaminated surfaces.

2. Description of the Prior Art

Prior to the 1960's, lead based pigments were commonly used in the formulation of paint. Since that time the public has become increasingly aware of the harm resulting from the ingestion of lead, the dangers of exposure to lead and of lead poisoning. The lead contained in these paints is not only dangerous when the paint itself peels from the surface to which it was previously applied, but lead is known to leach from the surface of the paint (or other material) causing contact in the form of dust as one simply touches the contaminated surface.

The Government has acknowledged the hazards associated with human and animal contact with lead based paint and The Department of Housing and Urban Development has issued guidelines for dealing with lead based paint hazard identification and abatement in public housing. In fact, the Federal Government has mandated lead abatement in public housing project modernization. Before undertaking such abatement projects, personnel are trained with regard to the safety issues surrounding lead abatement. Procedures are instituted to minimize lead pollution affecting both the workers and the environment. The need to wear protective clothing is a must, e.g., gloves, masks, eye protection, etc.

As those skilled in the art certainly appreciate, the dangers associated with lead paint, and other lead contamination, are especially pronounced for developing children and pets. In addition to the lower body weight of these potential victims, they are commonly unaware of the dangers associated with contacting the lead based surfaces, and regularly place their fingers and hands (paws for pets) in their mouths after contacting the contaminated surfaces.

Further, it has been found that children living in substandard housing or housing in general disrepair are likely to be especially at risk Such housing frequently includes layers of lead based painted which has not been removed. Even if these layers of contaminated paint are covered by subsequent layers of non-lead based paints, they present a risk via peeling paint or leaching though the subsequent coats of paint.

Since the acknowledgement of the dangers associated with lead based paints, two approaches for reducing exposure to lead painted surfaces have been adopted by those skilled in the art. The first approach involves the complete removal of the lead based paint or the surfaces onto which the lead based paint was previously applied. As one can certainly appreciate, complete removal of lead based paint is time consuming, costly and oftentimes entirely impractical.

With this in mind, techniques have been developed for covering the lead contaminated surfaces. These covering techniques attempt to resurface the contaminated surface so as to seal in the lead based paint, preventing exposure and accessibility to the lead. However, current covering techniques have many shortcomings limiting their usefulness.

With this in mind, a need exists for a covering technique whereby a lead contaminated surface may be securely and inexpensively covered so as to prevent future contact with the lead particles held within the contaminated surface. The present invention provides a solution to this problem.

SUMMARY OF THE INVENTION

It is, therefore, an object of the present invention to provide a lead abatement system approved for use by governmental agencies. The system includes a highly compliant protective film having an exposed layer and an adhesive layer composed of an adhesive material adapted for substantially permanent bonding to a contaminated surface. The system further includes a topcoat adapted for treatment of the exposed surface of the protective film so as to permit treatment of the exposed surface in a desired manner.

It is also an object of the present invention to provide a lead abatement system wherein the protective film includes an aluminum foil layer, a polyethylene layer and an adhesive layer.

It is another object of the present invention to provide a lead abatement system wherein the adhesive layer is composed of a flowable asphalt coating.

It is a further object of the present invention to provide a lead abatement system wherein the topcoat is composed of an acrylic primer which ensures bonding to the underlying aluminum film, a lead barrier compound which locks the topcoat to the exposed surface of the aluminum film, warm tap water which thins the topcoat and a Japan drier to enhance bonding by speeding up the drying process.

It is still another object of the present invention to provide a lead abatement system wherein the topcoat is composed of approximately 87% acrylic primer, approximately 11% lead barrier compound, approximately 2% warm tap water and a minimal amount of Japan drier.

It is yet another object of the present invention to provide a lead abatement system wherein the lead barrier compound is a high-solids, elastomeric- thermoplastic, water-based copolymer.

It is also an object of the present invention to provide a method for lead abatement. The method is achieved by first applying a highly compliant protective film over a lead contaminated surface. The film includes an exposed layer and an adhesive layer composed of an adhesive material adapted for substantially permanent bonding to the contaminated surface. The exposed surface is then perforated and a topcoat is applied to the exposed surface. The topcoat is adapted for treatment of the exposed surface of the film so as to permit treatment of the exposed surface in a desired manner.

It is a further object of the present invention to provide a method for lead abatement wherein the step of applying includes cutting the protective film to a desired size, applying the adhesive layer to the contaminated surface and smoothing the film to remove undesired wrinkles.

It is yet a further object of the present invention to provide a method for lead abatement wherein the step of applying further includes heating the film to activated the adhesive layer.

It is another object of the present invention to provide a method for lead abatement wherein the step of applying includes the additional step of rolling the protective film so as to ensure full contact of the protective film with the contaminated surface.

It is also an object of the present invention to provide a method for lead abatement wherein the step of applying includes heating the protective film to a temperature between 75° F. and 100° F. for a period of approximately 10–15 second.

It is also another object of the present invention to provide a method for lead abatement wherein the step of applying a topcoat includes coating the exposed surface with a thin coating of topcoat and heating the topcoat until dry.

It is a further object of the present invention to provide a method for lead abatement wherein the protective film includes an aluminum foil layer, a polyethylene layer and an adhesive layer composed of a flowable asphalt coating film.

It is also a further object of the present invention to provide a method for lead abatement including the following steps: cutting a protective film to a desired size, the protective film including an exposed layer and an adhesive layer composed of an adhesive material adapted for substantially permanent bonding to the contaminated surface, wherein the protective film includes an aluminum foil layer, a polyethylene layer and the adhesive layer, the adhesive layer being composed of a flowable asphalt coating including asphalt, styrene-butadiene-radial block copolymer and resin; heating the protective film to activated the adhesive layer; applying the adhesive layer to the contaminated surface; smoothing the protective film to remove undesired wrinkles; rolling the protective film after heating so as to ensure full contact of the protective film with the contaminated surface; and heating the protective film to a temperature between approximately 75° F. and approximately 100° F.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 1 is a cross sectional view of molding coated in accordance with the present invention.

FIG. 2 is an exploded perspective view of the protective film.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

With reference to FIGS. 1 and 2, a method and system are disclosed for encapsulating a lead contaminated surface 10 via a protective film 12 to achieve lead abatement protecting individuals from contact with the lead contained in the contaminated surface 10. The method and system further provide for the subsequent treatment, for example, painting, of the protective film 12. The construction and application of the film 12 provide for a near permanent seal which substantially resists puncture and/or removal.

The method is generally achieved by applying a highly compliant protective film 12 over a lead contaminated surface 10, perforating the exposed surface of the protective film 12 and applying a topcoat 14 to the exposed surface 16 of the protective film 12. The topcoat 14 is adapted for treatment of the exposed surface 16 of the protective film 12 so as to permit painting, or other treatment, of the exposed surface 16 in a desired manner.

The protective film 12 is preferably a self-adhering, sealing material with a reflective aluminum foil layer 17 along its exposed surface 16 and an adhesive layer 18 along its underside. A release sheet 20 is secured to the adhesive layer 18, protecting the same until the protective film 12 is ready for use. The protective film 12 features multiple laminations of special aluminum foil, high-density polymer films and a thick layer of rubberized asphalt waterproofing compound making up the adhesive layer 18.

Specifically, the protective film 12 includes an upper layer of aluminum foil 17 which functions as a barrier layer protecting individuals from the underlying contaminated surface 10. The aluminum foil 17 is relatively thin and very flexible. The flexibility of the aluminum foil 17 allows for the application of the present system over a wide range of surfaces since the film 12 will readily conform to the surface upon which it is applied. In addition, and in the event the film 12 is applied to a surface subjected to substantial sunlight, the aluminum foil 17 reflects ultraviolet rays which in turn reduces potential cracking of the bitumen layer due to reduced polymerization of the incorporated hydrocarbons.

The aluminum foil 17 is bonded to a high-density polyethylene film 22 by an ionomer resin 24. The polyethylene film 22 provides structural integrity to the film 12, and offers good elasticity and strength in tension. In addition, the high-density polyethylene film 22 is sufficiently resilient and maintains its desired shaped despite temporary distortion by tension forces.

Secured to the underside of the polyethylene film 22 is the adhesive layer 18. The adhesive layer 18 is composed of a coating of asphalt. The asphalt coating serves as an adhesive bonding the aluminum foil 17 and polyethylene film 22 to the contaminated surface 10. In additional, the asphalt coating is self-sealing at 60° F. and above. The asphalt coating's ability to self-seal ensures that the protection provided by the protective film 12 is not compromised by cuts or perforations which may be formed in the film 12. That is, the asphalt coating tends to seal punctures and breaks in the polyethylene film 22 should any occur, thereby maintaining the integrity of the seal provided by the protective film 12. The asphalt coating is composed of a mixture of asphalt, styrene-butadiene radial block copolymer, aromatic processing oil, hydrocarbon tackifying resin, antioxidant, and finely ground silica sand. It is mixed and blended in unique proportions and under unique physical conditions to achieve the desired puncture-proofing flowability characteristics.

In accordance with a preferred embodiment of the present invention, Quick Roof Peel & Seal Film, manufactured by CO-FAIR Corporation, is utilized, although it is contemplated that other equivalent materials may be used without departing from the spirit of the present invention. Films such as this are described in U.S. Pat. Nos. 4,936,938, 5096759 and 5,142,837, which are incorporated herein by reference. While a specific film is disclosed in accordance with a preferred embodiment of the present invention, other similarly constructed films may be used without departing from the spirit of the present invention.

With regard to the topcoat 14, the topcoat 14 is composed of approximately 87% by volume (1 gallon) exterior acrylic primer which ensures bonding to the underlying protective film 12 (and specifically the top layer of aluminum foil 17), approximately 11% by volume (16 oz.) lead barrier compound (LBC) which locks the topcoat to the exposed surface 16 of the aluminum foil 17, approximately 2% by volume (3 oz.) warm tap water which thins the overall topcoat and approximately 0.68% by volume (8 drops or approximately 1 ounce) Japan drier to enhance bonding by speeding up the drying process.

In accordance with a preferred embodiment, the exterior acrylic primer is STATE HOUSE exterior latex primer. The preferred Japan drier is E-Z Japan Drier, distributed by E.E. Zimmerman Company, Pittsburgh, Pa. Further, and in accordance with a preferred embodiment of the present invention the lead barrier compound is manufactured by FIBERLOCK. FIBERLOCK L-B-C is a high-solids, elastomeric-thermoplastic, water-based copolymer that meets or exceeds all projected federal, state and local standards for lead-based paint encapsulants. It is blended specifically to form a durable and flexible encapsulant barrier between lead based paint and the environment. FIBERLOCK L-B-C is environmentally friendly and complies with all federal and state VOC requirements. FIBERLOCK L-B-C contains BITREX®, a bitter tasting, non-toxic, anti-ingestant to discourage oral contact with lead paint. A 7-mil dry film thickness of FIBERLOCK L-B-C offers interior and exterior coverage and economics.

Although specific materials are described above for use in the preparation of the present topcoat composition, it is contemplated that these preferred materials may be replaced with comparable products without departing from the spirit of the present invention.

As briefly discussed above, the present method is achieved by first applying a highly compliant protective film 12 over a lead contaminated surface 10, perforating an exposed surface 16 of the protective film 12, applying a topcoat 14 adapted for treatment of the exposed surface 16 of the film 12 so as to permit subsequent treatment, for example, painting, of the exposed surface 16 in a desired manner. With regard to the step of applying the compliant film 12, it is specifically achieved by cutting the film 12 to a desired size, heating the film 12 to a temperature of approximately 75° F. to approximately 100° F. for about 10 seconds, applying the adhesive layer 18 to the contaminated surface 10 and smoothing the film 12 to remove undesired wrinkles. Smoothing is achieved by gently starting in the center of the film 12 and working your toward the edges of the film 12. The film 12 is then lightly heated (if necessary) to activate the adhesive layer 18.

After the film 12 has been heated to activate the adhesive layer 18, the film 12 is rolled so as to ensure full contact of the film 12 with the contaminated surface 10 and subsequently trimned to remove any excess film from the area surrounding the contaminated surface 10. The film 12 is then stapled along its edges to the underlying surface 10 and the edges are sealed with silicon caulk (not shown). Once the film 12 is properly positioned over the contaminated surface 10, the film 12 is heated to a temperature between approximately 75° F. and approximately 100° F. for a period of approximately 10–15 seconds.

Once the film 12 is fully set upon the contaminated surface 10, the film 12 is prepared for further processing through the application of a topcoat 14 thereto. Before the topcoat 14 is coated upon the exposed surface of the film 12, the film 12 is perforated using a sharpened roller which creates a series of perforations 26 within the film. The perforations 26 are slight and merely extend though the surface of the film 12 without extending all the way to the underlying contaminated surface 10.

After the film 12 has been fully perforated, the topcoat 14 is applied and heated until dry. Application of the topcoat 14 is performed, as with conventional painting, through either the utilization of a brush or roller. Subsequent heating of the topcoat 14 (with a heat gun at a temperature between approximately 275° F. and approximately 325° F. until drying of the topcoat is completed) ensures that the topcoat 14 fully sets upon the film 12 and bonds thereto. After the topcoat 14 is fully bonded and dried upon to the film 12, one may coat the treated film with any desired paint or other surfacing material.

The present method and system for encapsulating lead contaminated surfaces offers reliable lead abatement at a reasonable cost. Through the utilization of a highly compliant protective film and a primer specifically engineered for use with the aluminum foil layer of the film, the present system allows for coverage over existing molding, walls, window sills, etc., without negatively effecting the details or structure of the surface over which it is applied. In fact, the efficacy of the present system is proven out by the approval status granted by the Maryland Department of the Environment.

The present invention has been tested in various manners, showing that it is a secure and reliable system for lead abatement. For example, the finished product has been subjected to heat from approximately 275° F. to 375° F. for a period of 4 hours. The heat was applied through the use of a heat gun positioned at a distance of 12 inches from the finished product. The finished product has also been placed within a household freezer for 14 days. Regardless of the application of heat or cold, the finished product exhibits no damage.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A method for lead abatement, comprising the following steps:
    applying a highly compliant protective film over a lead contaminated surface, the film includes an exposed layer and an adhesive layer composed of an adhesive material adapted for substantially permanent bonding to the contaminated surface;
    perforating the exposed surface of the protective film;
    applying a topcoat to the exposed surface, the topcoat being adapted for treatment of the exposed surface of the film so as to permit treatment of the topcoat in a desired manner.

2. The method according to claim 1, wherein the step of applying includes cutting the protective film to a desired size, applying the adhesive layer to the contaminated surface and smoothing the film to remove undesired wrinkles.

3. The method according to claim 2, wherein the step of applying further includes heating the film to activated the adhesive layer.

4. The method according to claim 3, wherein the step of applying includes the additional step of rolling the protective film so as to ensure full contact of the protective film with the contaminated surface.

5. The method according to claim 4, wherein the step of applying includes heating the protective film to a temperature between 75° F. and 100° F. for a period of approximately 10–15 second.

6. The method according to claim 1, wherein the step of applying a topcoat includes coating the exposed surface with a thin coating of topcoat and heating the topcoat until dry.

7. The method according to claim 1, wherein the protective film includes an aluminum foil layer, a polyethylene layer and an adhesive layer composed of a flowable asphalt coating film.

8. The method according to claim 1, wherein the topcoat is composed of:

an acrylic primer which ensures bonding to the underlying protective film;

a lead barrier compound which locks the topcoat to the exposed surface of the protective film;

warm tap water which thin the overall topcoat; and a Japan drier to enhance bonding by speeding up the drying process.

9. The method according to claim 8, wherein the topcoat is composed of approximately 87% acrylic primer, approximately 11% lead barrier compound, approximately 2% warm tap water and a minimal amount of Japan drier.

10. A method for lead abatement, comprising the following steps:

cutting a protective film to a desired size, the protective film including an exposed layer and an adhesive layer composed of an adhesive material adapted for substantially permanent bonding to a lead contaminated surface, wherein the protective film includes an aluminum foil layer, a polyethylene layer and an adhesive layer, the adhesive layer being composed of a flowable asphalt coating including asphalt, styrene-butadiene-radial block copolymer and resin;

heating the protective film to activated the adhesive layer;

applying the adhesive layer to the lead contaminated surface;

smoothing the protective film to remove undesired wrinkles;

rolling the protective film after heating so as to ensure full contact of the protective film with the lead contaminated surface; and heating the protective film to a temperature between approximately 75° F. and approximately 100° F.

11. The method according to claim 10, further including the step of perforating the exposed surface after heating to between approximately 75° F. and approximately 100° F. and applying a topcoat to the exposed surface, the topcoat being adapted for treatment of the exposed surface of the protective film so as to permit treatment of the exposed surface in a desired manner.

12. The method according to claim 11, wherein the topcoat is composed of:

an acrylic primer which ensures bonding to the underlying protective film;

a lead barrier compound which locks the topcoat to the exposed surface of the protective warm tap water which thin the overall topcoat; and a Japan drier to enhance bonding by speeding up the drying process.

13. The method according to claim 11, wherein the topcoat is composed of approximately 87% acrylic primer, approximately 11% lead barrier compound, approximately 2% warm tap water and a minimal amount of Japan drier.

14. The method according to claim 13, wherein the protective film is heated to a temperature between approximately 275° F. and approximately 325° F. until drying of the topcoat is completed.

* * * * *